United States Patent [19]

Quaney

[11] 4,059,199
[45] Nov. 22, 1977

[54] UTILITY BOX FASTENER

[75] Inventor: Patrick E. Quaney, Fountain Valley, Calif.

[73] Assignee: Associated Concrete Products, Inc., Santa Ana, Calif.

[21] Appl. No.: 700,629

[22] Filed: June 28, 1976

[51] Int. Cl.$^2$ ............................................. H02G 3/08
[52] U.S. Cl. .................... 220/3.8; 85/32 K; 151/41.7; 174/66; 220/327
[58] Field of Search ............... 85/32 R, 32 K, 32.1; 151/41.7; 174/55, 66, 53, 54, 67; 220/3.8, 327, 328

[56] References Cited

U.S. PATENT DOCUMENTS

| | | | |
|---|---|---|---|
| 913,875 | 3/1909 | Cleverdon et al. | 85/32 K |
| 1,026,035 | 5/1912 | Hedden | 85/32 K |
| 1,284,404 | 11/1918 | Manneschmidt | 220/328 X |
| 1,505,910 | 8/1924 | Michelin | 85/32 K |
| 1,949,333 | 2/1934 | Saunders | 85/32 K |
| 2,250,580 | 7/1941 | Gregory | 85/32 K |
| 2,458,927 | 1/1949 | Beck | 174/66 X |
| 2,474,328 | 6/1949 | Rothfuchs | 174/66 X |
| 3,835,906 | 9/1974 | Dietlein | 151/41.7 X |

FOREIGN PATENT DOCUMENTS

| | | | |
|---|---|---|---|
| 812,540 | 4/1959 | United Kingdom | 151/41.7 |
| 902,147 | 7/1962 | United Kingdom | 151/41.7 |

Primary Examiner—Stephen Marcus
Attorney, Agent, or Firm—Knobbe, Martens, Olson, Hubbard & Bear

[57] ABSTRACT

A threaded fastener with a central portion separating wider flanges with straight polygonal sides and straight normal flange faces embedded in a plastic. One flange face is flush with the surface of the embedding body to provide a load bearing surface preventing compression of the body.

6 Claims, 3 Drawing Figures

UTILITY BOX FASTENER

BACKGROUND OF THE INVENTION

This invention is for a threaded fastener embedded in a plastic material of a utility box for holding bolts with a large applied torque to fasten a corner on the box.

In recent years, vaults or boxes for protecting underground permanently installed utility equipment have been constructed from plastics. It has been customary to hold the covers to these boxes in place by simply bolting on the cover, and applying sufficient torque to the bolt to hold the bolt tightly in place. This prevents the bolt from being loosened accidently, or by a curious passer-by, or a mischievious juvenile. Since these boxes protect circuits that are very dangerous and frequently vital in the distribution of utilities, it is readily apparent that a simple system which will provide security and quick repair access is highly desireable. In the past, the torque that could be applied to the bolt fastening the cover of these boxes was limited by the arrangement for holding the nut to, for example, about 25 ft-lbs. torque.

Fasteners made in accordance with this invention have considerably increased the torque which can be applied. For example, fasteners in accordance with this invention have withstood 55 ft-lbs., and, in fact, the bolt will usually shear before the fastener will rotate using the instant invention.

Secondly, prior art threaded fasteners embedded in the plastic have tended to pull out axially due to axial stress when the bolt is threaded through it and tightened. An advantage of the instant invention is to provide much greater resistence to this tendency. Comparable prior fasteners withstood only up to around 600 pounds of axial pull, whereas the instant invention has withstood up to 900 pounds axial pull.

Finally, it has been observed that pressure brought directly upon the plastic in which the fastener is embedded tends to reduce the ability of the plastic to resist rotation and axial pulling of the fastener. The instant invention provides for the fastener to act as a bearing surface, to avoid compression of the embedding plastic upon the torqueing a threaded bolt into place.

DETAILED DESCRIPTION OF THE INVENTION

Figure 1:
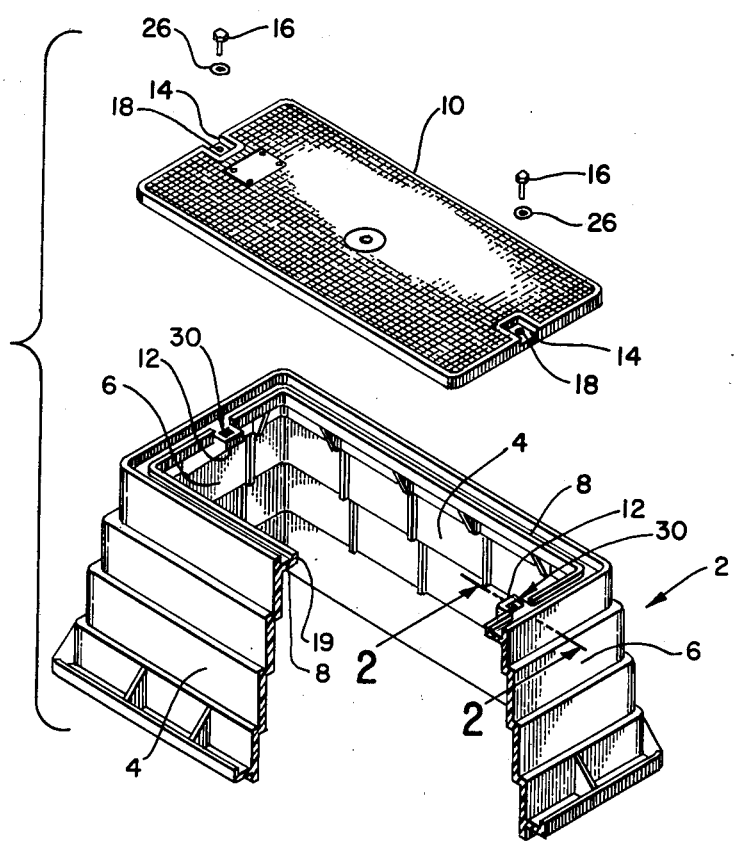
FIG. 1 is an exploded perspective view of a utility box utilizing the invention.

FIG. 1 shows a utility box designed to be buried and house electric cable or other utilities for underground installations. Such boxes are of a type known in the prior art except for the incorporation of the fastener of this invention as will be described hereinafter.

The utility box includes a body portion 2 having two side walls 4 and two end walls 6 with an internal shoulder 8 formed near the top for receiving a cover 10 which is fastened down to the body to protect the contents. The box is installed with the cover exposed for access to the box from above.

The shoulder 8 includes a boss 12 at each end flush with the shoulder. The fastener of this invention is embedded in the bosses. The cover includes recessed areas 14 at each end generally aligned with the bosses 12. A threaded hold-down bolt 16 extends through an aperture 18 in each recessed area into the associated fastener to retain the cover on the box. The body 2 preferably is made of structural foam plastic material. The cover 10 may be made of structural foam plastic or of steel or concrete, or other materials. An upstanding flange 19 on the shoulder 8 extends into a mating groove on the bottom of the cover to provide weather protection.

Figure 2:
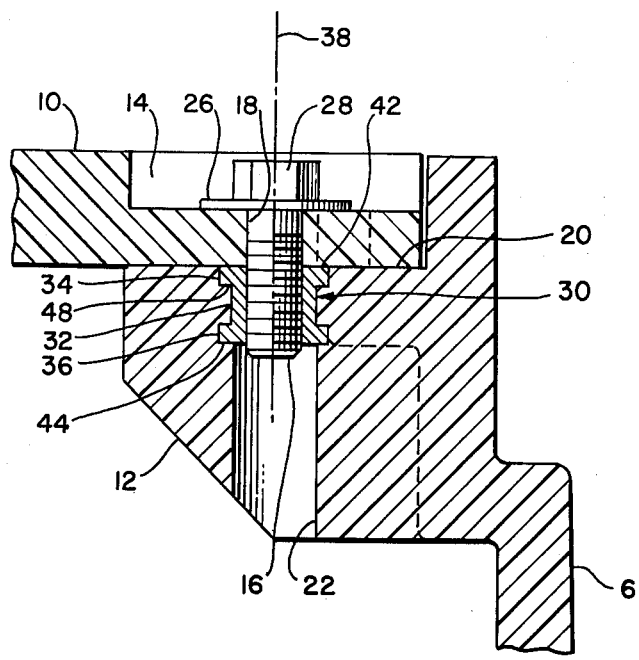
FIG. 2 is a sectional view of the fastener embedded in plastic and used with a threaded bolt, taken generally along lines 2—2 of FIG. 1.

As shown in FIG. 2, the boss 12 comprises an integral greatly thickened portion of the plastic end wall 6 of sufficient thickness to provide adequate strength for holding the cover 10. The boss has an upper flat surface 20 which is arranged generally horizontal, and an oversized, unthreaded bore 22 extending vertically through the boss to accommodate the hold-down bolt 16. The bore 18 through the cover is unthreaded and is large enough in diameter to loosely receive the bolt 16. A washer 26 is placed between the cover and bolt head 28 providing an adequate bearing surface for the bolt on the cover.

Figure 3:
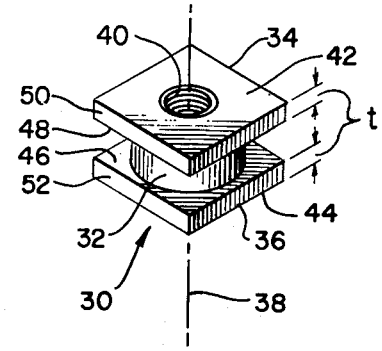
FIG. 3 is a perspective view of the threaded fastener.

In the preferred embodiment, the threaded female fastener 30 is a unitary metal machined part around which the plastic boss is molded so that the fastener is tightly embedded therein. Referring to FIG. 2 and 3, the fastener includes a cylindrical central shank 32 having upper 34 and lower 36 flanges at its ends, disposed normal to the longitudinal axis 38 of the shank 32. A threaded bore 40 extends axially completely through the fastener for holding the threaded bolt. The upper flange has a flat top surface 42 which is substantially flush, or in some instances even slightly raised above, the upper surface 20 of the boss. The bottom surface 44 of the lower flange is partially embedded in the plastic which extends below the fastener. The lower flange also has a flat upper surface 46 which forms a shoulder perpendicular to the bore axis 38. The upper flange has a similar shoulder 48 on its underside. Each shoulder 46, 48 extends entirely around the cylindrical shank 32, as the flange portion is wider than the diameter of the shank. Each of the flanges has a substantial vertical thickness so that its peripheral surface 50, 52 provides a substantial, blunt, bearing surface against the plastic boss. The plastic material of the boss completely fills the space between the flange shoulders 46, 48 and tightly engages the peripheral surfaces of the central shank and the two flanges to firmly hold the fastener in place.

The peripheral edges 50, 52 of the flanges preferably are straight and without any irregular surfaces. In the preferred embodiment they are square although they might be other shapes, preferably a polygon with four or less sides in order to provide the maximum resistance to torque as the bolt is fastened.

As the bolt is tightened into place the upward-facing shoulder 46 bears against the plastic material filling the space between the two shoulders to prevent the fastener from pulling axially out from the boss. The blunt peripheral surfaces 50, 52 of the flanges also bear against the plastic in which they are embedded to prevent twisting of the fastener in the plastic as torque is applied to the bolt. In this regard, the greatest resistance to twisting as the bolt is torqued comes from the portions of the flanges which are the greatest distance from the center of the bolt. In the preferred embodiment that would be the corners of the square. Thus, it is preferable to have those corners of the square extend out as far as convenient from the axis of the bolt. Generally a triangular, square or rectangular configuration would provide better torque resistance than, for example, an octagon.

With plastic material such as structural foam plastic, it has been found that there is an increased tendency for the fastener 30 to loosen in the plastic if the cover bears principally on the boss 12 rather than directly on the fastener 30. Accordingly, the upper surface 42 of the fastener 30 is located at about the same height as the upper surface 20 of the boss, resulting in the boss taking little or no compressive load. Compression of the plastic holding the fastener apparently tends to pull the plastic away from the fastener and cause the fastener to loosen.

The bolt head 28 preferably is made in a pentagonal shape. Since conventional wrenches are not so shaped, this presents an added barrier to removal of the firmly fastened bolt.

What is claimed is:

1. A hold-down device for affixing a cover to a plastic box comprising:
    a female fastener having a central shank portion with a threaded bore through its axis and top and bottom flanges at its opposite ends normal to the axis of the bore;
    each said flange having a substantial thickness parallel to the axis of said bore to define a blunt peripheral bearing surface;
    the bottom flange extending beyond the periphery of said central shank portion to form an upwardly facing shoulder entirely around the lower end of said shank;
    a box composed of plastic material which undergoes significant compression under load;
    a portion of said plastic box being molded tightly around said fastener and bearing against the peripheral bearing surfaces of the flanges and against the upwardly facing shoulder of the lower flange, said plastic extending in between the two flanges;
    a cover on said box;
    the upper surface of said upper flange bearing on said cover; and
    a threaded bolt extending through said cover and threaded into said fastener.

2. A hold-down device as defined in claim 1 wherein said upwardly facing shoulder is perpendicular to the axis of said bore.

3. A hold-down device as defined in claim 1 wherein said flanges are in horizontal plan view a polygon of no more than four sides.

4. A hold-down device as defined in claim 3 wherein each side of said polygon is straight.

5. A hold-down device in claim 1 wherein said plastic of the box extends below said fastener and is engaged against its lower surface.

6. A fastener in combination with a utility box and cover device comprising:
    a utility box having at least one upright compressible plastic wall forming a closed shape open at the top;
    an upwardly facing internal shoulder on said wall near the top thereof;
    a pair of plastic bosses integral with said plastic wall and having a flat upper surface flush with said shoulder;
    a cover resting on said boss upper surface and said shoulder;
    a fastener embedded in said plastic boss, said fastener including,
    a central cylindrical shank;
    a threaded bore extending axially through said shank;
    an upper flange at the top of said shank and integral therewith;
    a lower flange at the bottom of said shank and integral therewith;
    each flange being larger in horizontal section than the central shank so as to extend beyond the periphery of the shank on all sides and form opposed shoulders;
    said opposed shoulders being flat and disposed in a plane perpendicular to the axis of said shank;
    the plastic boss firmly bearing against the peripheral surfaces of the shank and both flanges, and against the opposed shoulders of the flanges and against the lower face of the lower flange;
    the upper face of the upper flange being disposed generally co-planar with the upper surface of the boss so that the cover bears thereon; and
    a bolt extending through said cover and tightly threaded into the bore of the fastener.

* * * * *

UNITED STATES PATENT AND TRADEMARK OFFICE
CERTIFICATE OF CORRECTION

PATENT NO. : 4,059,199

DATED : November 22, 1977

INVENTOR(S) : Patrick E. Quaney

It is certified that error appears in the above–identified patent and that said Letters Patent are hereby corrected as shown below:

Column 1, line 19, change "desireable" to --desirable--; line 43, delete "the" before "torqueing".

Column 4, line 9, after "device" and before "in Claim 1", insert --as defined--.

Signed and Sealed this

Eighteenth Day of April 1978

[SEAL]

Attest:

RUTH C. MASON
Attesting Officer

LUTRELLE F. PARKER
Acting Commissioner of Patents and Trademarks